United States Patent
Pursifull et al.

(10) Patent No.: US 11,136,011 B2
(45) Date of Patent: Oct. 5, 2021

(54) METHOD AND SYSTEM FOR VEHICLE CONTROL

(71) Applicant: Ford Global Technologies, LLC, Dearborn, MI (US)

(72) Inventors: Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 16/162,138

(22) Filed: Oct. 16, 2018

(65) Prior Publication Data

US 2020/0114885 A1   Apr. 16, 2020

(51) Int. Cl.
| | | |
|---|---|---|
| *B60W 30/18* | (2012.01) | |
| *B60T 7/12* | (2006.01) | |
| *B60W 10/06* | (2006.01) | |
| *B60W 10/18* | (2012.01) | |

(52) U.S. Cl.
CPC ............ *B60T 7/122* (2013.01); *B60W 10/06* (2013.01); *B60W 10/18* (2013.01); *B60W 30/18036* (2013.01); *B60W 2520/10* (2013.01); *B60W 2540/10* (2013.01); *B60W 2540/12* (2013.01); *B60W 2710/083* (2013.01); *B60W 2710/18* (2013.01)

(58) Field of Classification Search
CPC . B60T 7/122; B60W 30/18036; B60W 10/06; B60W 10/18; B60W 10/10; B60W 2520/10
See application file for complete search history.

(56) References Cited

U.S. PATENT DOCUMENTS

| | | | | |
|---|---|---|---|---|
| 3,540,556 A | * | 11/1970 | Snoy ....................... | F16H 61/66 192/221 |
| 3,910,389 A | * | 10/1975 | Pleier .................... | B60T 11/103 192/219 |
| 3,913,700 A | * | 10/1975 | James ................. | F16H 61/0246 180/271 |
| 4,248,330 A | * | 2/1981 | Audiffred, Jr. ........ | B60W 10/11 192/219 |
| 4,300,652 A | | 11/1981 | Redzinski et al. | |
| 5,588,515 A | * | 12/1996 | Toyama ................ | B60W 10/06 192/109 F |
| 5,795,252 A | | 8/1998 | Crucet | |
| 6,811,015 B2 | * | 11/2004 | Tietze ....................... | B60T 7/12 192/218 |
| 7,946,404 B2 | * | 5/2011 | Nakagawa ............ | B60W 10/02 192/219 |
| 8,092,340 B2 | | 1/2012 | Song et al. | |
| 8,386,131 B2 | * | 2/2013 | Thaduvayi ............... | B60K 6/46 701/36 |
| 9,290,182 B2 | * | 3/2016 | Dlugoss ............... | B60W 10/115 |
| 2015/0307101 A1 | | 10/2015 | Ries et al. | |

* cited by examiner

*Primary Examiner* — Sherry L Estremsky
(74) *Attorney, Agent, or Firm* — Geoffrey Brumbaugh; McCoy Russell LLP (57) ABSTRACT

Methods and systems are provided for mitigating reverse vehicle rollback. In one example, in response to a request to shift a transmission from reverse to forward when vehicle speed is elevated, vehicle brakes are applied and the actual transmission shift is delayed until the vehicle motion in the reverse direction is sufficiently decelerated. Additionally, the engine may be stalled and restarted before the transmission shift is performed.

17 Claims, 5 Drawing Sheets

METHOD AND SYSTEM FOR VEHICLE CONTROL

FIELD

The present description relates generally to methods and systems for controlling a vehicle engine to reduce engine stall and vehicle rollback after a requested change in direction of vehicle motion from reverse to forward direction.

BACKGROUND/SUMMARY

A vehicle operator may shift a gear lever selector (e.g., PRNDL) to select between a forward direction gear (e.g., D or L) and a reverse direction gear (R). In some cases, the vehicle operator may select a forward gear while the vehicle is travelling backwards (or vice versa). Typically, the operator expects that the vehicle will slow down, stop, and then move in the requested direction opposite to the current direction of motion. However, based on the transmission configuration as well as the vehicle speed at which the change in direction was requested, the outcome may differ. For example, if the transmission is shifted to a forward gear while the vehicle is at a low speed (such as below 4 mph), the transmission gear is disengaged from the reverse gear and engaged into the forward gear, and the vehicle can then accelerator forward in accordance with the accelerator pedal position. In comparison, if the transmission is shifted to the forward gear at a slightly higher reverse speed (such as above 7 mph), the transmission may disengage from the reverse gear and shift to the forward gear, but then the engine may stall. The vehicle may stall because a reverse engine torque is applied to the engine from the vehicle (through the transmission) when shifted into a forward speed while traveling in reverse. This reversing engine torque is not successfully compensated by the idle speed control and the engine speed drops to the point where an engine stall occurs.

One example approach for reducing such engine stalls is shown by Song et al. in U.S. Pat. No. 8,092,340. Therein, the transmission is held either fully disengaged or with controlled slip when a change in direction is requested. Further, the engagement of the transmission gear is delayed until the vehicle speed falls to a threshold speed.

However, the inventors herein have identified a potential issue with such an approach. In some transmission configurations, such as a 10 speed transmission, if the operator selects a forward gear at the elevated reverse speed, the engine controller shifts the transmission to neutral, even though the operator selected a forward gear. This may cause the vehicle to roll back and/or delay forward motion as desired. In addition, there is still a chance that the engine may stall depending on the timing of the neutral shift. Further still, the delay in transmission gear engagement may be long enough to be objectionable by the vehicle operator.

In one example, the above issues may be addressed by a method for an engine comprising: automatically applying vehicle brakes and maintaining a current gear in response to a request to shift a transmission from reverse to forward when vehicle speed is greater than a threshold speed. In this way, vehicle rollback may be stopped. In addition, a shift to the forward gear can be delayed to reduce the possibility of an engine stall.

As one example, in response to a vehicle operator selecting a forward gear while a vehicle in travelling at a slightly elevated speed in a reverse direction, the vehicle controller may apply a braking torque on vehicle wheels (such as via wheel brakes) while maintaining the transmission in reverse. Once the reverse vehicle speed has slowed to below a threshold speed (such as below 2 mph), the transmission is shifted to the forward gear, via an interim neutral gear. In an alternate example, in response to the operator selection of a forward gear during reverse travel, the engine is allowed to stall while vehicle brakes are adjusted to decelerate vehicle rollback toward a zero speed. Then, the engine is restarted and the transmission is shifted to the requested forward gear. The technical effect of applying a brake torque to vehicle wheels responsive to selection of a forward gear during reverse vehicle travel is that vehicle rollback is mitigated. In addition, by reducing vehicle speed via brake actuation, the delay in forward transmission gear engagement is decreased, improving driver satisfaction. By allowing an engine to stall when a reversal of direction of vehicle motion is requested, rollback may be mitigated without the need to measure the reverse speed at which a forward gear was selected. This reduces control complexity. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
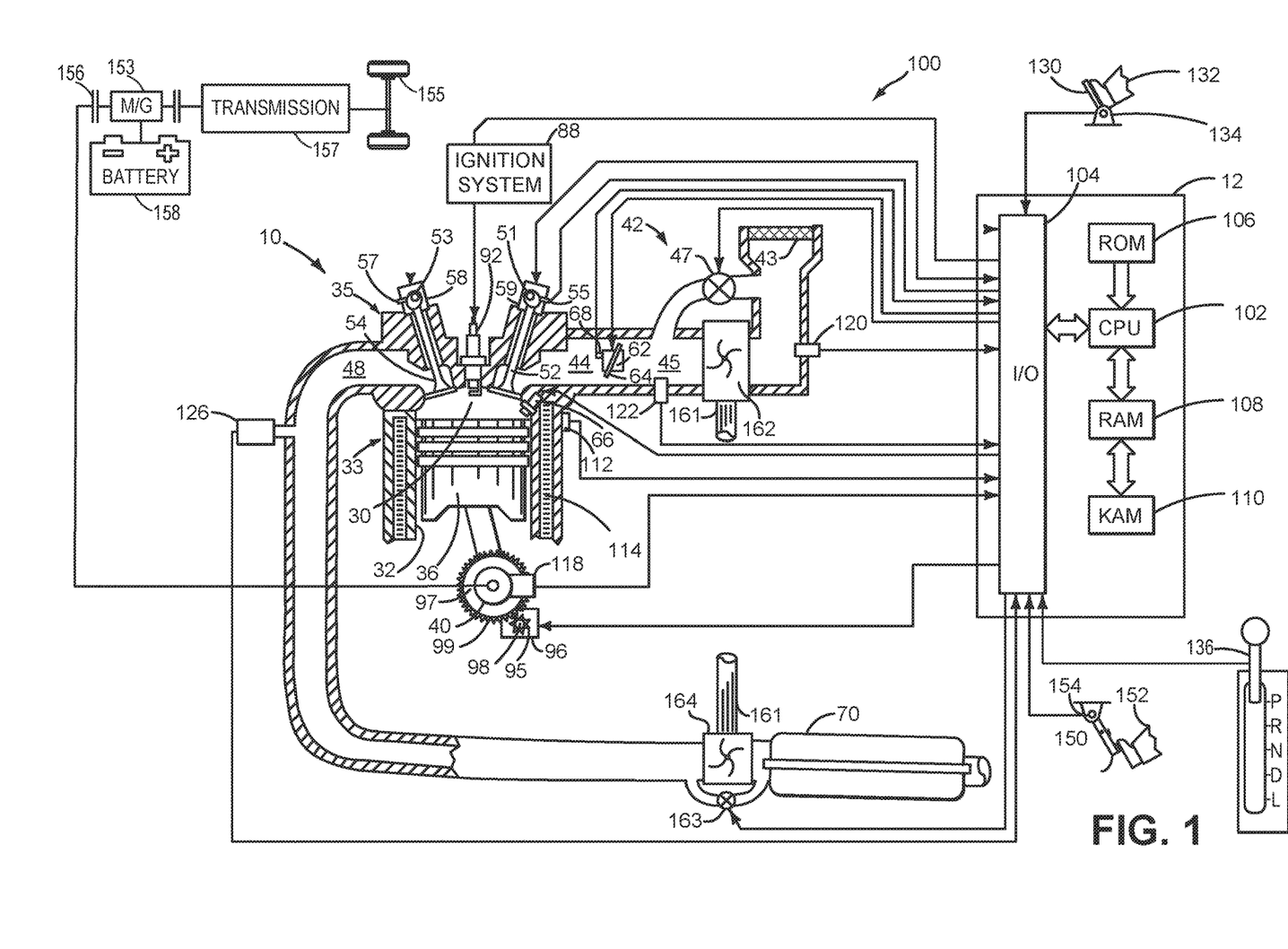
FIG. 1 is a schematic diagram of an engine system coupled in a hybrid vehicle system.
Figure 2:
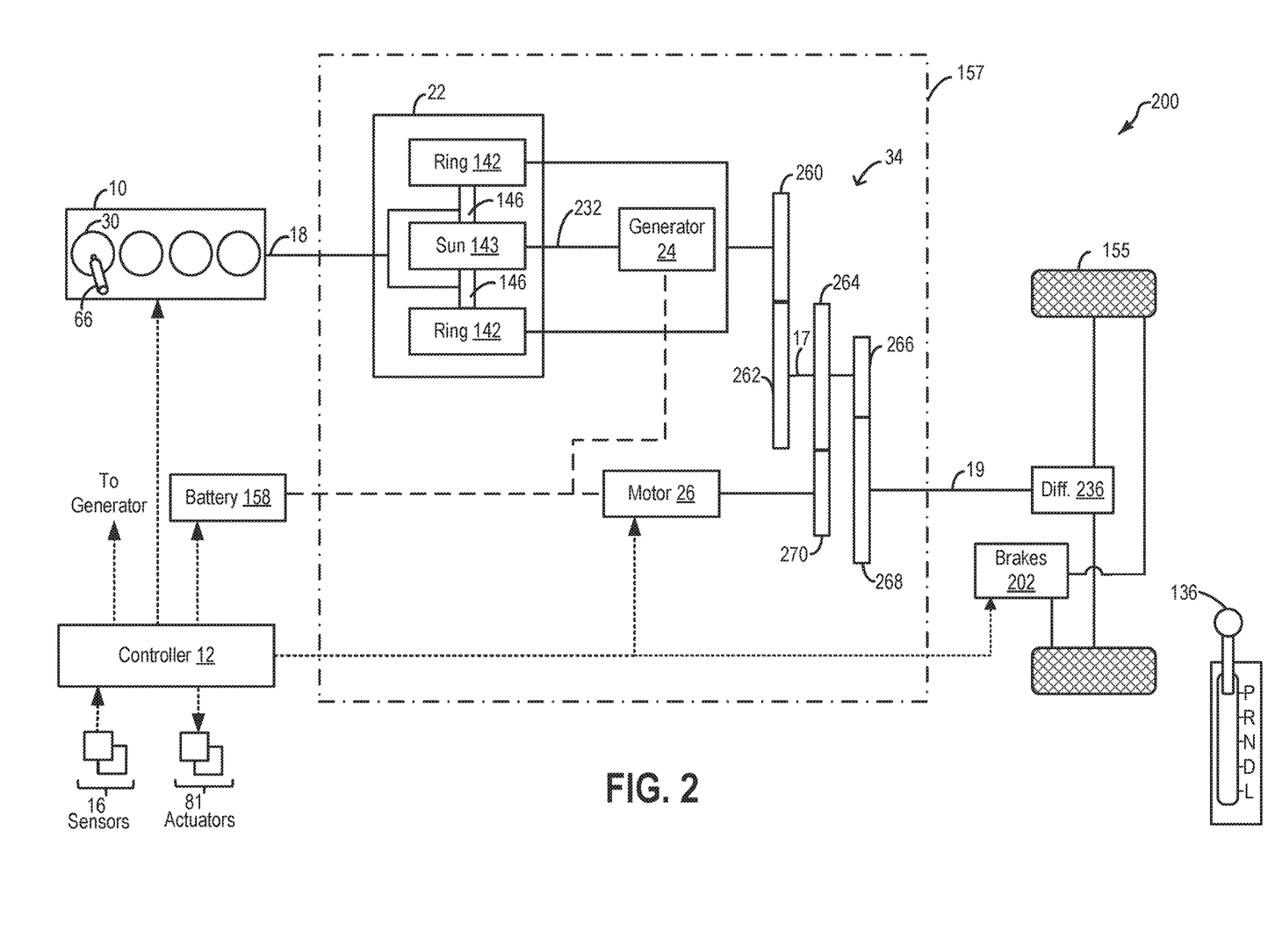
FIG. 2 shows an example powertrain of a hybrid vehicle system.

The following description relates to systems and methods for addressing reverse stall and reverse rollback in a vehicle system, such as the system of FIG. 2, which includes the engine system of FIG. 1. Reverse stall and/or reverse rollback may be induced when an operator puts a vehicle in a forward gear while traveling backwards. A controller may be configured with instructions to perform a control routine, such as the example routine of FIGS. 3-4, to preempt the reverse stall and rollback by adjusting vehicle braking and a transmission gear shift schedule. An example adjustment is shown with reference to FIG. 4. In this way, vehicle performance is improved.

Referring to FIG. 1, an internal combustion engine 10 is shown. Engine 10 may be included in a drivetrain of a vehicle 100 configured for on-road propulsion, such as the drivetrain of FIG. 2. In one example, vehicle 100 is a hybrid electric vehicle.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In further embodiments, fuel may be delivered into an intake port of cylinder 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 may adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal or brake pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. The accelerator pedal and brake pedal may be combined for example in a pivoting setup to select either acceleration of braking. Further, the accelerator may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive operator input via a transmission lever or gear shift selector 136. Selector 136 may be manually shifted between different gear options by the vehicle operator based on a desired transmission output and a desired direction of vehicle motion. In one example embodiment, as depicted, the operator may have the following operator selectable options: park (P), reverse (R), neutral (N), drive (D), and low (L). In the depicted embodiment, the shift selector is known as a PRNDL lever, corresponding to the different options. In one example, when in park or neutral, substantially no torque may be transmitted from the engine to the transmission output. When in park, the vehicle is immobile. In drive, an electronic controller can control the transmission to select any available forward gear ratios, enabling the vehicle to move in a forward direction. In reverse, a single reverse gear is selected, enabling the vehicle to move in a backward or reverse direction. In low, only a lower set of forward gear ratios can be selected by the electronic controller. In some embodiments, there may be a low 1 and low 2 option. Shift selector 136 may be located on a steering column or between driver and passenger seats of the vehicle.

The controller 12 receives signals from the various sensors of FIG. 1 and employs the various actuators of FIG. 1, such as throttle 62, fuel injector 66, spark plug 91, etc., to adjust engine operation based on the received signals and instructions stored on a memory of the controller. As one example, the controller may send a pulse width signal to the fuel injector to adjust an amount of fuel delivered to a cylinder.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 100 may be a hybrid vehicle with multiple sources of torque available to one or more vehicle wheels 155. In other examples, vehicle 100 is a conventional vehicle with only an engine, or an electric vehicle with only electric machine(s). In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155 when one or more clutches 156 are engaged. In the depicted example, a first clutch 156 is provided between crankshaft 40 and electric machine 153, and a second clutch 156 is provided between electric machine 153 and transmission 157. Controller 12 may send a signal to an actuator of each clutch 156 to engage or disengage the clutch, so as to connect or disconnect crankshaft 40 from electric machine 153 and the components connected thereto, and/or connect or disconnect electric machine 153 from transmission 157 and the components connected thereto. Transmission 154 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

FIG. 2 depicts a hybrid propulsion system 200 for a vehicle. In the depicted embodiment, the vehicle is a hybrid electric vehicle (HEV), such as vehicle 100 of FIG. 1. Propulsion system 200 includes an internal combustion engine 10 (such as engine 10 of FIG. 1) having a plurality of cylinders 30. Fuel may be provided to each cylinder of engine 10 from a fuel system (not shown) including one or more fuel tanks, one or more fuel pumps, and injectors 66.

Engine 10 delivers power to transmission 157 via torque input shaft 18. In the depicted example, transmission 157 is a power-split transmission (or transaxle) that includes a planetary gearset 22 and one or more rotating gear elements. Transmission 157 further includes an electric generator 24 and an electric motor 26. The electric generator 24 and the electric motor 26 may also be referred to as electric machines as each may operate as either a motor or a generator. Torque is output from transmission 157, for propelling vehicle tractions wheels 155, via a power transfer gearing 34, a torque output shaft 19, and differential-and-axle assembly 236.

Generator 24 is drivably connected to electric motor 26 such that each of electric generator 24 and electric motor 26 may be operated using electric energy from an electrical energy storage device, herein depicted as battery 158. In some embodiments, an energy conversion device, such as an inverter, may be coupled between the battery and the motor to convert the DC output of the battery into an AC output for use by motor. However, in alternate embodiments, the inverter may be configured in the electric motor. Due to the mechanical properties of the planetary gearset, generator 24 may be driven by a power output element (on an output side) of the planetary gearset 22 via mechanical connection 232, as further elaborated below.

Electric motor 26 may be operated in a regenerative mode, that is, as a generator, to absorb energy from vehicle motion and/or the engine and convert the absorbed kinetic energy to an energy form suitable for storage in battery 158 Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode).

Planetary gearset 22 comprises a ring gear 142, a sun gear 143, and a planetary carrier assembly 146. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 155 via power transfer gearing 34 including one or more meshing gear elements 260-268. In one example, the meshing gear elements 260-268 may be step ratio gears wherein carrier assembly 46 may distribute torque to the step ratio gears. The step ratio gears may include, for example, a neutral gear, a reverse gear, and one or more forward gears. Gear elements 262, 264, and 266 are mounted on a countershaft 17 with gear element 264 engaging an electric motor-driven gear element 270. Electric motor 26 drives gear element 270, which acts as a torque input for the countershaft gearing. In this way, the planetary carrier 146 (and consequently the engine and generator) may be coupled to the vehicle wheels and the motor via one or more gear elements. An operator may select a transmission gear via actuation of gear shift selector 136, as discussed at FIG. 1.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

For example, the vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 155 (the generator may also be providing torque to wheels if in motoring mode). During the "engine" mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 143, producing a reaction torque to the engine. Consequently, torque is output by the planetary carrier to gears 262, 264, 266 on countershaft 17, which in turn delivers the power to wheels 155. Optionally, the engine can be operated to output more torque than is needed for propulsion, in which case the additional power is absorbed by the generator (in generating mode) to charge the battery 158 or supply electrical power for other vehicle loads.

In another example, the vehicle may be driven in a second engine-on mode, herein also referred to as an "assist" mode. During the assist mode, engine 10 is operated and used as the primary source of torque for powering wheels 155 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels.

In still another example, the vehicle may be driven in an engine-off mode, herein also referred to as an electric-only mode, wherein battery-powered electric motor 26 is operated and used as the only source of torque for driving wheels 155. As such, during the engine-off mode, no fuel may be injected into engine 10 irrespective of whether the engine is spinning or not. The "engine-off" mode may be employed, for example, during braking, low speeds, while stopped at traffic lights, etc. Specifically, motor power is delivered to gear element 270, which in turn drives the gear elements on countershaft 17, and thereon drives wheels 155.

Propulsion system 200 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. Input may also be received via the shift selector 136, a brake pedal, an accelerator pedal, a vehicle speed sensor, and the other sensors of FIG. 1. The various actuators may include, for example, the gear set, cylinder fuel injectors (not shown), an air intake throttle coupled to the engine intake manifold (not shown), and the actuators of FIG. 1. Controller 12 may receive input data from the various sensors, process the input data, and trigger the actuators in response to the processed input data based on instruction or code programmed therein corresponding to one or more routines. Example control routines are described herein with regard to FIG. 3.

For example, a frictional force may be applied to wheels 155 by engaging friction wheel brakes 202. In one example, friction wheel brakes 202 may be engaged in response to the driver pressing his foot on a brake pedal (not shown). In addition, as elaborated with reference to FIG. 3, the vehicle controller 12 may engage the wheel brakes 202 in response to an operator request to shift the transmission 157 from a reverse gear setting to a forward gear setting while the vehicle speed is elevated above a threshold speed. A brake control module of the controller 12 may adjust the brake torque applied to the wheels via the wheel brakes in concert with an engine brake torque from engine 10 and/or a motor brake torque from motor 26 in order to apply a net amount of brake torque on the wheels that decelerates the vehicle's reverse motion at a target rate of deceleration. In the same way, the frictional force may be reduced to wheels 155 by disengaging wheel brakes 202 in response to the driver releasing his foot from a brake pedal, or the vehicle reverse speed falling below a threshold. As a further example, vehicle brakes may apply a frictional force to wheels 155 as part of an automated engine stopping procedure, and release the frictional force as part of an engine restart procedure. It will be appreciated that in further embodiments, operator controls that combine brake, accelerator, and vehicle direction selection may be combined into a joystick-like control.

Thus, the components of FIGS. 1 and 2 provide for a system, comprising an engine; a transmission including a forward, reverse, and neutral setting; a gear selector switch for selecting between the forward, reverse, and neutral setting of the transmission; wheel brakes; a vehicle speed sensor; and a controller with computer readable instructions stored on non-transitory memory that when executed cause the controller to: responsive to a request to shift the transmission from the reverse setting to the forward setting when vehicle speed is greater than a threshold speed, actuate the brakes to reduce the vehicle speed; and delay the shift until the vehicle speed is below the threshold speed. However, this invention also encompasses operator controls that combine brake, accelerator, and vehicle direction selection into a joystick-like control.

Figure 3:
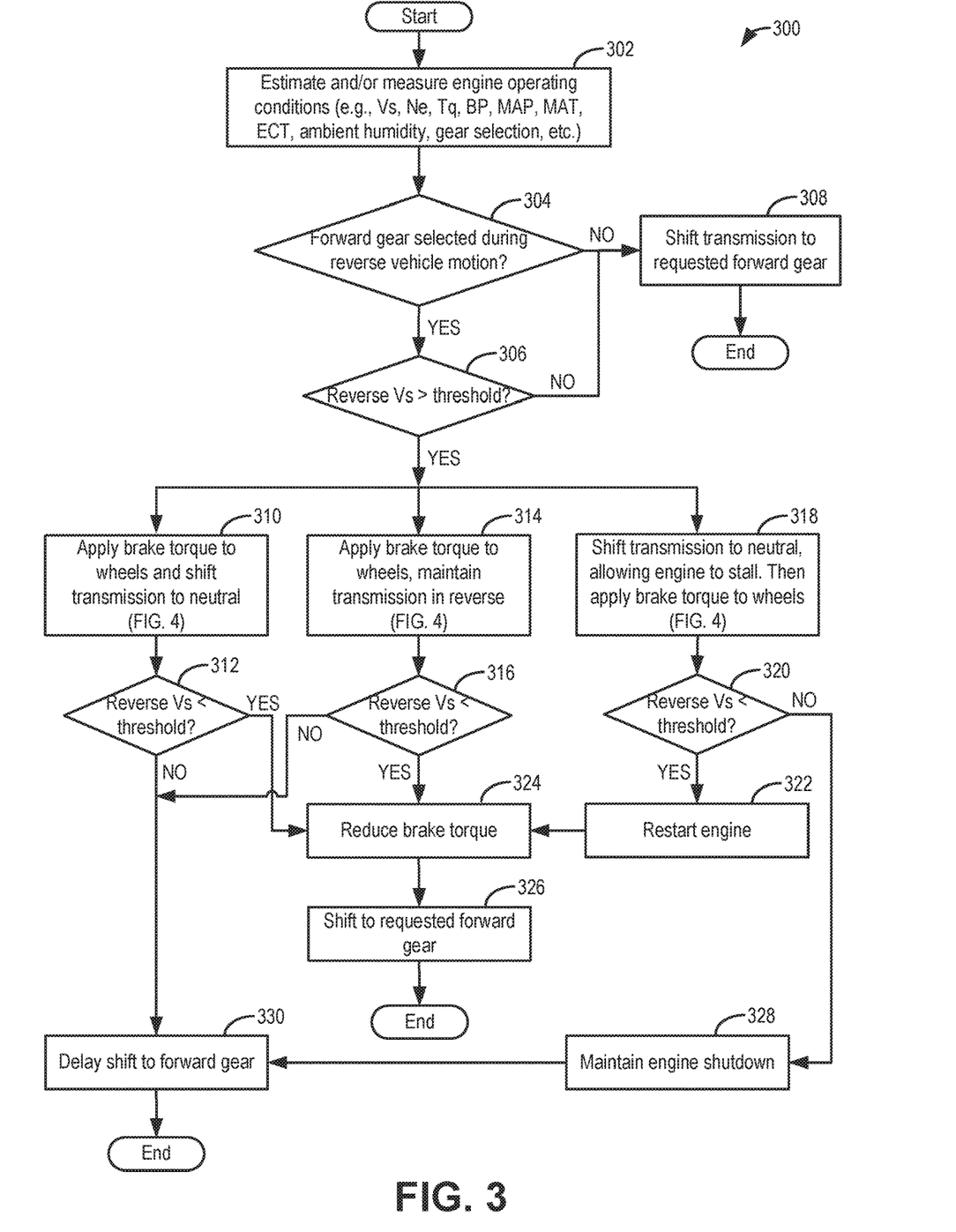
FIG. 3 shows a high level flowchart of an example method for reducing engine rollback when a forward gear is selected during reverse vehicle motion.

Turning now to FIG. 3, an example method 300 is shown for reducing reverse rollback and reverse stall when an operator selects a forward gear on a shift selector while a vehicle is moving in reverse. Instructions for carrying out method 300 may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

In the case where the vehicle direction selection is opposite of vehicle direction (or wheel direction), we wish to make those agree. To do so, we intend to decelerate the vehicle or the vehicle wheels to zero speed and then accelerate them into the desired travel direction. In the case where forward direction is selected but the vehicle velocity is negative, we choose to primarily use the brakes to decelerate the vehicle or vehicle wheels to near zero velocity and then apply a forward torque to accelerate the vehicle in the desired motion direction using the IC engine and/or electric motor. During this operation, engine speed is maintained (or restored to in the case of a stall) a minimum engine idle speed.

At 302, the method includes estimating and/or measuring vehicle operating conditions. For example, the estimated conditions may include one or more of vehicle speed, engine speed, driver torque demand, manifold temperature and pressure, boost pressure, and ambient conditions such as ambient temperature, humidity, and barometric pressure.

At 304, it may be confirmed that a forward gear has been selected during reverse vehicle motion. For example, the vehicle may be moving in reverse with a shift selector in the R setting, and it may be confirmed that an operator has moved the shift selector to a forward gear setting, such as to D or L positions. If a forward gear has not been selected during reverse vehicle motion, such as when an alternate forward gear is selected during forward vehicle motion, the method moves to 308 to shift the transmission to the requested forward gear. The vehicle then continues to move in the forward direction. Alternatively, if no forward gear is selected, the reverse gear is maintained, and the vehicle may continue to move backwards. The method then exits.

If a forward gear has been selected during reverse vehicle motion, then at 306, the method includes estimating the reverse vehicle speed and comparing it to a non-zero threshold. In one example, the threshold is a first, upper threshold, above which an immediate shift to the requested forward gear may not be possible without inducing a reverse engine stall (if the vehicle was being propelled with engine torque) or a vehicle rollback. As an example, the first threshold may be 7 mph. As another example, the first threshold may be 4 mph. If the forward gear is selected while the vehicle is travelling in reverse below the threshold speed, then the method moves to 308 to shift the transmission from the reverse gear to the requested forward gear. The vehicle then proceeds to move in the forward direction.

If a forward gear has been selected while the vehicle is moving backwards at above the first threshold speed, then the controller may reduce rollback by applying a brake torque and adjusting a transmission shift schedule.

As a first example, at 310, the controller may reduce rollback speed by applying brake torque to vehicle wheels to decelerate the reverse motion while shifting the transmission from the reverse gear into a neutral gear. Herein the brake torque is applied to the wheels in the absence of an operator brake demand. For example, applying brake torque may include the controller applying wheel brakes without receiving operator input from brake pedals (that is, without the operator applying the brake pedals). Alternatively, brake torque may be applied via a combination of engine brake torque, motor brake torque, and wheel brakes, as elaborated at FIG. 4. In one example, the degree of applying brake torque is adjusted based on the reverse vehicle speed. In addition, the ratio of engine brake torque, motor brake torque, and wheel brakes is varied based at least on a battery state of charge.

Next, at 312, it may be determined if the reverse vehicle speed is below a threshold. The threshold may be a second, lower threshold below which a transmission shift can be enabled without incurring an engine stall. The second threshold may be the same as, or lower than, the first threshold. As an example, the second threshold may be 4 mph. As another example, the second threshold may be 2 mph. If the reverse vehicle speed has not dropped below the second threshold, then at 328, the controller may delay the shift of the transmission to the requested forward gear until the vehicle motion has sufficiently slowed, while continuing to apply brake torque to reduce the reverse vehicle speed and while maintaining the transmission in the neutral gear. Else, once the reverse vehicle motion has sufficiently slowed, at 324, the controller may shift the transmission from the neutral gear to the requested forward gear. In one example, responsive to the forward gear selection during reverse vehicle motion, the controller may apply brake torque to the vehicle wheels while shifting the transmission to a neutral gear (from the reverse gear) during a first condition including vehicle reverse speed being higher than a first speed threshold, such as above 10 mph. For example, if a driver wishes to shift to neutral when shifting to a forward gear, an engine stall or reverse rotation may occur above 10 mph reverse speed. Then, when the reverse speed drops via brake torque application, the controller may then shift the vehicle to a forward gear when stall is unlikely. However, should a stall result, a restart may be prescribed to restore the intended engine speed. Additionally or optionally, instead of shifting the transmission to neutral, the controller may reject the accelerator pedal request for non-zero engine torque.

As a second example, at 314, the controller may reduce rollback speed by applying brake torque to vehicle wheels to decelerate the reverse motion while maintaining the transmission in the current, reverse gear. As at 310, the brake torque is applied to the wheels in the absence of an operator brake demand, such as by applying wheel brakes without the operator applying the brake pedals. Alternatively, brake torque may be applied via a combination of engine brake torque, motor brake torque, and wheel brakes as elaborated at FIG. 4. In one example, the degree of applying brake torque is adjusted based on the reverse vehicle speed. In addition, the ratio of engine brake torque, motor brake torque, and wheel brakes is varied based at least on a battery state of charge. Next, at 316, it may be determined if the reverse vehicle speed is below the second threshold. If the reverse vehicle speed has not dropped below the second threshold, then at 328, the controller may delay the shift of the transmission to the requested forward gear until the vehicle motion has sufficiently slowed, while continuing to apply brake torque to reduce the reverse vehicle speed and while maintaining the transmission in the neutral gear. Else, once the reverse vehicle motion has sufficiently slowed, at 324, the controller may shift the transmission from the neutral gear to the requested forward gear. In one example, responsive to the forward gear selection during reverse vehicle motion, the controller may apply brake torque to the vehicle wheels while maintaining the transmission in the reverse gear during a second condition including vehicle speed being lower than the first speed threshold, such as below 10 mph, but above a second speed threshold (lower than the first speed threshold), such as above 6 mph. The transmission is kept in reverse while the brakes are actively correcting the vehicle direction. Alternatively, could the vehicle may be shifted to neutral. Keeping the transmission in reverse prevents a stall but so does shifting to neutral (while reverse speed is still high). While the transmission is kept in reverse, engine speed may be limited to an engine idle speed so that the driver stepping on the accelerator pedal does not make the car go faster in reverse (since the operator has selected forward and thus is expecting forward motion soon).

As a third example, at 318, the controller may reduce rollback by shifting the transmission to neutral. Herein the engine stalls because being in a forward gear while the vehicle is rolling backwards slows the engine to a point where it stalls instead of maintaining an idle speed. Then the controller may apply brake torque to vehicle wheels to decelerate the reverse motion. As at 310 and 314, the brake torque is applied to the wheels in the absence of an operator brake demand, such as by applying wheel brakes without the operator applying the brake pedals. Alternatively, brake torque may be applied via a combination of engine brake torque, motor brake torque, and wheel brakes, as elaborated at FIG. 4. In one example, the degree of applying brake torque is adjusted based on the reverse vehicle speed. In addition, the ratio of engine brake torque, motor brake torque, and wheel brakes is varied based at least on a battery state of charge. Next, at 320, it may be determined if the reverse vehicle speed is below the second threshold. If the reverse vehicle speed has not dropped below the second threshold, then at 326, the method includes maintain the engine shut down. Further, at 328, the controller may delay the shift of the transmission to the requested forward gear until the vehicle motion has sufficiently slowed. Else, once the reverse vehicle motion has sufficiently slowed, at 322, the controller may restart the engine, such as by cranking the engine via a starter motor. At 324, the controller may shift the transmission from the neutral gear to the requested forward gear. In one example, responsive to the forward gear selection during reverse vehicle motion, the controller may allow the engine to stall while applying brake torque to the vehicle wheels during a third condition.

The controller may shift the transmission to neutral, slow the vehicle down with brakes, and then shift to a forward gear. If the controller were to simply shift directly to a forward gear, such as at 15 mph in reverse, a stall is likely to occur. Thus, the controller may decide to delay the shift to a forward gear until there is some finite chance of no stall while being ready for an engine re-start if a stall does occurs, such as at a threshold of 3 to 5 mph. In one example, the controller may choose a braking rate of 0.2 g if the accelerator pedal is not deflected and a greater acceleration rate if the pedal is deflected.

Further, based on the condition, the controller may vary a ratio of brake torque from vehicle brakes relative to engine brake torque or motor torque during the wheel braking. For example, during a first condition when the reverse vehicle speed at which the operator makes a forward gear selection is higher, or when the engine speed at which the operator makes a forward gear selection is higher, the controller may maintain the transmission in the current reverse gear and use regenerative brake torque, engine brake torque, and/or motor brake torque to reduce the vehicle speed before transitioning the transmission to the forward gear via the neutral gear. In comparison, during a second condition when the reverse vehicle speed at which the operator makes a forward gear selection is lower, or when the engine speed at which the operator makes a forward gear selection is lower, the controller may shift the transmission to the neutral gear and use wheel brake torque, and optionally motor brake torque, to reduce the vehicle speed before transitioning the transmission to the forward gear. Herein, the transition to the neutral gear is earlier than the first condition. For example, when maintaining the current reverse gear and transitioning to the neutral gear later, a first ratio of regenerative brake torque is applied via the engine relative to wheel brake torque applied via the wheel brakes. In comparison, when transitioning to the neutral gear earlier, a second ratio of regenerative brake torque is applied relative to wheel brake torque, the first ratio including a higher proportion of engine brake torque, the second ratio including a higher proportion of wheel brake torque.

Further still, the brake torque application may be a function of a state of charge of a system battery so that regenerative brake torque can be advantageously used when possible to reduce the vehicle reverse speed while adding charge to a system battery. This may be possible only if the battery SOC is low enough to allow charge to be accepted. If the battery SOC is higher than a threshold and the battery is already charged, then regenerative brake torque may not be used.

In this way, by applying brake torque to vehicle wheels responsive to a forward gear being selected during reverse vehicle motion, vehicle rollback is automatically corrected. In addition, a smoother transition from the reverse gear to a forward gear is enabled.

Figure 4:
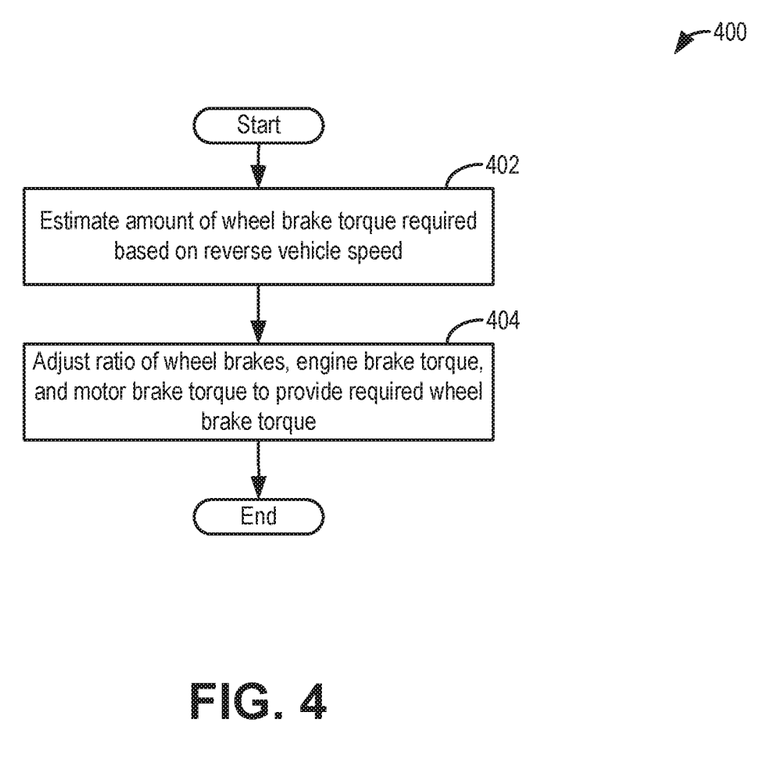
FIG. 4 shows a high level flowchart of an example method for providing a wheel brake torque via a combination of wheel brake application, engine brake torque, and motor torque.

FIG. 4 shows a high level flow chart of an example method 400 for adjusting an amount of wheel brake torque applied to reduce vehicle reverse rollback. The method of FIG. 4 may be performed as part of the method of FIG. 3, such as at 310, 314, or 318. In each case, the brake torque applied may be adjusted to a different combination of wheel brake application, engine brake torque, and motor torque.

At 402, a controller may estimate the amount of wheel brake torque required based on reverse vehicle speed. For example, as the reverse vehicle speed increases, the amount of brake torque and/or degree of braking required is increased. At 404, the controller may adjust the ratio of wheel brake application, engine brake torque, and motor brake torque to provide the required wheel brake torque. In one example, the ratio is adjusted based on a battery state of charge (SOC). For example, as the battery SOC increases, the proportion of motor torque is increased, and as the battery SOC decreases, the proportion of motor torque is decreased. As another example, the proportion is adjusted based on the selected mode of vehicle operation. For example, the proportion of motor brake torque is increased when the vehicle is operating in an electric mode, and the proportion of engine brake torque is increased when the vehicle is operating in an engine or assist mode.

As an example, a vehicle operator may have moved the shift selector from reverse to forward while the vehicle is rolling backwards. In response, the controller may use the brakes to slow the vehicle's reverse speed before returning to normal acceleration control. Normal acceleration control is controlled by both the brake and accelerator. While firmly applying the brake pedal, the vehicle remains stationary. Releasing the brake (zero grade) results in a creep torque being applied that accelerates the vehicle to a terminal velocity of typically 10 kph. Applying the accelerator pedal calls for acceleration or vehicle speed maintenance. Therefore, while the transmission selector is in forward and the vehicle is in reverse, foot-off-brake and foot-off-accelerator result in a braking deceleration rate of 0.2 g. This braking deceleration would increase with accelerator position deflection.

Figure 5:
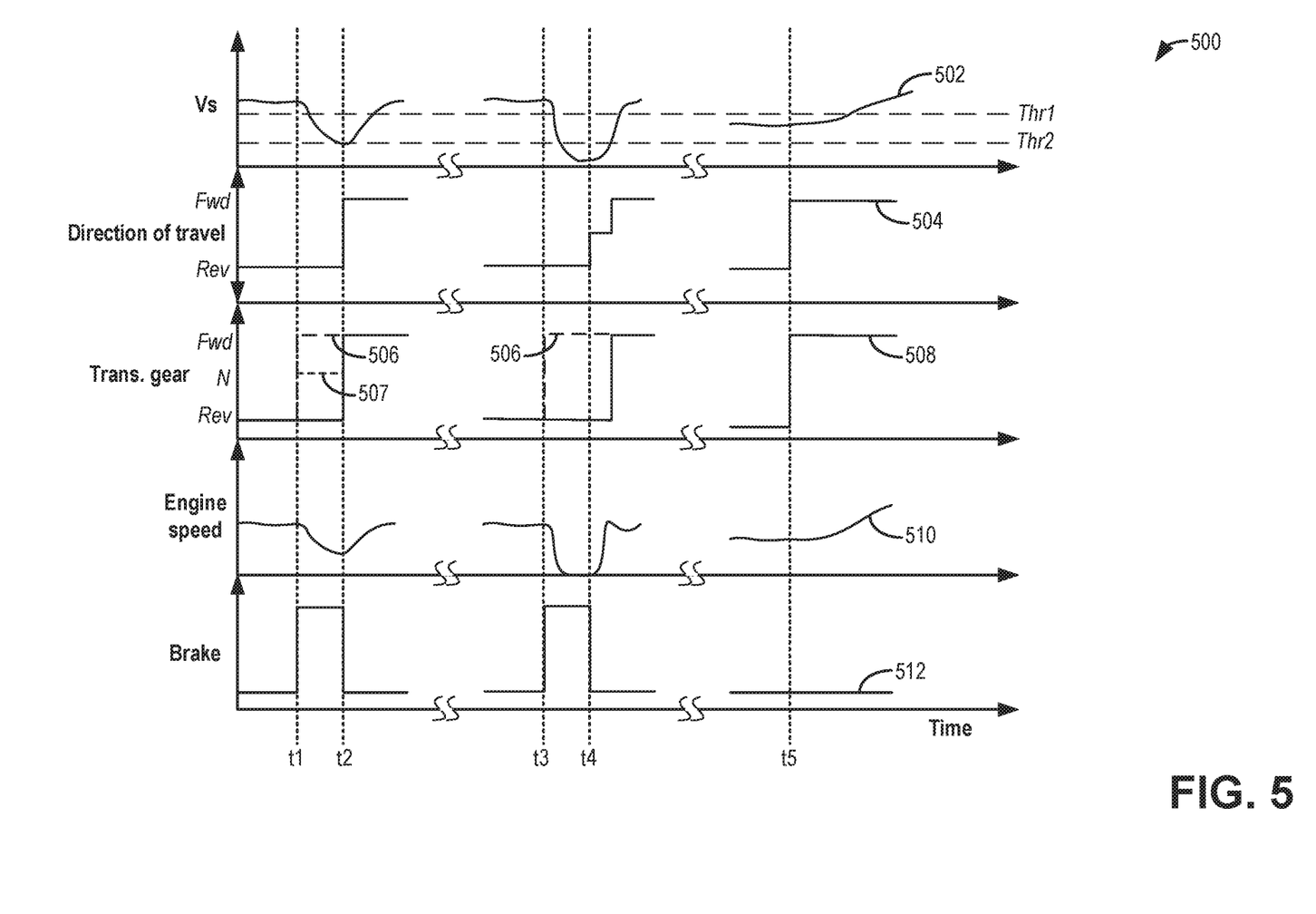
FIG. 5 shows a prophetic example of adjusting vehicle braking and transmission gear engagement responsive to an operator selected reversal of vehicle motion direction

Turning now to FIG. 5, example adjustments made to reduce reverse rollback are depicted. Map 500 depicts vehicle speed at plot 502. An actual direction of vehicle travel (forward or reverse) is indicated at plot 504. An operator selected direction of travel is shown at plot 506. A transmission gear command based on the operator selection is shown at plot 507. An actual transmission gear selection (between a forward, reverse, and neutral gear) is shown at plot 508. Plot 510 represents engine speed, while plot 512 depicts wheel brake application. All plots are indicated over time along the x-axis.

Prior to t1, a vehicle is moving in reverse at a vehicle speed that is above a first threshold speed Thr1. The vehicle is being propelled backwards, with the transmission in reverse gear, via engine torque as indicated by the engine speed changing in concert with the vehicle speed. Wheel brakes are not applied. At t1, while the vehicle is moving backwards, the operator selects a forward direction of vehicle travel (plot 506) by commanding a forward gear on the shift selector, as indicated at plot 507. Due to the forward gear being selected while the vehicle is travelling backwards above speed Thr1, there is a possibility of unintentionally high rollback speed. To address this, at t1, wheel brakes are applied responsive to the gear shift request, even though the operator has not applied a brake pedal. At the same time, the transmission is maintained in the reverse gear (plot 508) and an actual shift to the operator selected forward transmission gear is delayed. Alternatively, as indicated at dashed plot 509, the transmission may be shifted from reverse to neutral at t1. Due to application of the wheel brakes, the vehicle reverse motion decelerates and the engine speed also concurrently reduces as engine fueling is disabled. At t2, when the vehicle speed is at or below a lower threshold speed Thr2, the transmission is shifted to the requested forward gear and the vehicle starts to move forward. As such, if the brakes were not applied and the transmission was shifted from reverse gear to forward gear at t1, the vehicle may have rolled back while the operator expected the vehicle to move forward. In addition, the engine may have stalled.

Another rollback speed mitigating action is shown at t3, which is depicted as a time after t2 in the same drive cycle. Prior to t3, as at t1, the vehicle is moving in reverse at a vehicle speed that is above first threshold speed Thr1. The vehicle is being propelled backwards, with the transmission in reverse gear, via engine torque as indicated by the engine speed changing in concert with the vehicle speed. Wheel brakes are not applied. At t3, while the vehicle is moving backwards, the operator selects a forward gear on the shift selector, as indicated by plot 506. Due to the forward gear being selected while the vehicle is travelling backwards above speed Thr1, there is a possibility of rollback. To address this, at t3, wheel brakes are applied responsive to the gear shift request, even though the operator has not applied a brake pedal. At the same time, the transmission is maintained in the reverse gear and a shift to the operator selected forward gear is delayed. Due to the shift to neutral gear, the engine speed falls and the engine stalls. Concurrently, due to application of the wheel brakes, the vehicle reverse motion decelerates. Between t3 and t4, the engine is shutdown while the vehicle reverse motion decelerates. At t4, when the vehicle speed is at or below the lower threshold speed Thr2, the engine is restarted, such as by cranking the engine via a starter motor and resuming cylinder fueling. After cranking the engine, shortly after t4, the transmission is shifted to the requested forward gear and the vehicle starts to move forward.

Another example operation is shown at t5, which is depicted as a time after t4 in the same drive cycle. Prior to t5, the vehicle is moving in reverse at a vehicle speed that is below first threshold speed Thr1. The vehicle is being propelled backwards, with the transmission in reverse gear, via engine torque as indicated by the engine speed changing in concert with the vehicle speed. Wheel brakes are not applied. At t5, while the vehicle is moving backwards, the operator selects a forward gear on the shift selector. Due to the forward gear being selected while the vehicle is travelling backwards below speed Thr1, the transmission is immediately shifted and wheel brakes are not applied responsive to the gear shift request due to the lower possibility of a rollback.

In this way, reverse rollback is mitigated, improving vehicle performance and driver satisfaction. The technical effect of decelerating vehicle roll back towards zero speed via control of wheel brakes, upon shift selector actuation from reverse to forward at an elevated reverse speed, is that a transmission shift can be enabled without unintended vehicle motion. By delaying the shift to forward gear after the reverse speed has sufficiently slowed, unintended engine stalls that may occur during a reversal of direction of vehicle motion are also reduced. The technical effect of not accepting an operator command to shift to a forward gear while a vehicle is in high speed reverse is that unwanted engine stalls are pre-empted. By shifting the vehicle to a neutral gear, or by rejecting the accelerator pedal request for non-zero engine torque, and by automatically applying wheel brakes, the vehicle can shifted to a forward gear once it is slow enough, thereby always being prepared to restart it the engine happens to stall. By releasing the brake on near-forward motion, a smoother vehicle launch is provided.

One example method for operating a vehicle, comprising automatically applying vehicle brakes and maintaining a current gear in response to a request to shift a transmission from reverse to forward when vehicle speed is greater than a threshold speed. In the preceding example, additionally or optionally, the method further comprises, delaying an actual shift of the transmission from reverse to forward until the vehicle speed is below the threshold speed. In any or all of the preceding examples, additionally or optionally, automatically applying vehicle brakes in response to the request includes applying the vehicle brakes independent of a position of a brake pedal. In any or all of the preceding examples, additionally or optionally, applying vehicle brakes includes applying brake torque to vehicle wheels via one or more of wheel brakes, engine brake torque, and motor brake torque, and where a degree of torque applied is based on the greater than threshold vehicle speed. In any or all of the preceding examples, additionally or optionally, the method further comprises, stalling an engine while maintaining the current gear. In any or all of the preceding examples, additionally or optionally, the engine is restarted before the actual shift of the transmission from reverse to forward. In any or all of the preceding examples, additionally or optionally, the request to shift the transmission from reverse to forward includes an operator moving a gear shift selector from a reverse gear setting to a forward gear setting. In any or all of the preceding examples, additionally or optionally, the vehicle speed greater than the threshold speed includes vehicle speed during reverse vehicle motion. In any or all of the preceding examples, additionally or optionally, the threshold speed includes zero speed. In any or all of the preceding examples, additionally or optionally, the threshold speed is a non-zero speed.

Another example method for operating a vehicle, comprises stalling an engine in response to a request to shift a transmission from reverse to forward when vehicle speed is greater than a threshold speed; automatically applying vehicle brakes; and automatically starting the engine when vehicle speed is zero. In the preceding example, additionally or optionally, the method further comprises, in response to a request, shifting the transmission from reverse to neutral and maintaining the transmission in neutral until the vehicle speed falls from greater than the threshold speed to zero. In any or all of the preceding examples, additionally or optionally, the method further comprises shifting the transmission from neutral to forward after automatically starting the engine. In any or all of the preceding examples, additionally or optionally, automatically applying vehicle brakes in response to the request includes applying the vehicle brakes without receiving operator input via a brake pedal. In any or all of the preceding examples, additionally or optionally, the vehicle speed includes the speed of vehicle travel in a reverse direction, and wherein the request to shift the transmission includes a request for vehicle travel in a forward direction.

Another example vehicle system comprises: an engine; a transmission including a forward, reverse, and neutral setting; a gear selector switch for selecting between the forward, reverse, and neutral setting of the transmission;

vehicle wheels including wheel brakes; a vehicle speed sensor; and a controller with computer readable instructions stored on non-transitory memory that when executed cause the controller to: responsive to a request to shift the transmission from the reverse setting to the forward setting when vehicle speed is greater than a threshold speed, apply brake torque to the vehicle wheels to reduce the vehicle speed; and delay the shift until the vehicle speed is below the threshold speed. In the preceding example, additionally or optionally, the delay in the shift includes: during a first condition, maintaining the transmission in the reverse setting until the vehicle speed is below the threshold speed; and during a second condition, shifting the transmission to the neutral setting, stalling the engine, and maintaining the transmission in the neutral setting with the engine shutdown until the vehicle speed is below the threshold speed. In any or all of the preceding examples, additionally or optionally, the controller includes further instructions that cause the controller to: restart the engine after the vehicle speed is below the threshold speed and before shifting the transmission from the neutral setting to the forward setting during the second condition. In any or all of the preceding examples, additionally or optionally, the brake torque applied to the vehicle wheels includes applying, during the first condition, a first ratio of regenerative brake torque applied via the engine relative to wheel brake torque applied via the wheel brakes, and applying, during the second condition, a second ratio of regenerative brake torque relative to wheel brake torque, the first ratio including a higher proportion of engine brake torque, the second ratio including a higher proportion of wheel brake torque. In any or all of the preceding examples, additionally or optionally, the controller actuates the brakes automatically, without receiving operator input from a brake pedal.

In a further representation, the vehicle system is a hybrid electric vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
   automatically applying vehicle brakes and maintaining a current gear in response to a request to shift a transmission from reverse to forward when vehicle speed is greater than a threshold speed,
   delaying an actual shift of the transmission from reverse to forward until the vehicle speed is below the threshold speed, and
   stalling an engine while maintaining the current gear.

2. The method of claim 1, wherein automatically applying vehicle brakes in response to the request includes applying the vehicle brakes independent of a position of a brake pedal.

3. The method of claim 1, wherein applying vehicle brakes includes applying brake torque to vehicle wheels via one or more of wheel brakes, engine brake torque, and motor brake torque, and where a degree of torque applied is based on the greater than threshold vehicle speed.

4. The method of claim 1, wherein the engine is restarted before the actual shift of the transmission from reverse to forward.

5. The method of claim 1, wherein the request to shift the transmission from reverse to forward includes an operator moving a gear shift selector from a reverse gear setting to a forward gear setting.

6. The method of claim 1, wherein the vehicle speed greater than the threshold speed includes vehicle speed during reverse vehicle motion.

7. The method of claim 1, wherein the threshold speed includes zero speed.

8. The method of claim 1, wherein the threshold speed is a non-zero speed.

9. A method for operating a vehicle, comprising:
   stalling an engine in response to a request to shift a transmission from reverse to forward when vehicle speed is greater than a threshold speed;
   automatically applying vehicle brakes; and
   automatically starting the engine when vehicle speed is zero.

10. The method of claim 9, further comprising, in response to a request, shifting the transmission from reverse to neutral and maintaining the transmission in neutral until the vehicle speed falls from greater than the threshold speed to zero.

11. The method of claim 10, further comprising, shifting the transmission from neutral to forward after automatically starting the engine.

12. The method of claim 9, wherein automatically applying vehicle brakes in response to the request includes applying the vehicle brakes without receiving operator input via a brake pedal.

13. The method of claim 9, wherein the vehicle speed includes a speed of vehicle travel in a reverse direction, and wherein the request to shift the transmission includes a request for vehicle travel in a forward direction.

14. A vehicle system, comprising:
an engine;
a transmission including a forward, reverse, and neutral setting;
a gear selector switch for selecting between the forward, reverse, and neutral setting of the transmission;
vehicle wheels including wheel brakes;
a vehicle speed sensor; and
a controller with computer readable instructions stored on non-transitory memory that when executed cause the controller to:
responsive to a request to shift the transmission from the reverse setting to the forward setting when vehicle speed is greater than a threshold speed,
apply brake torque to the wheels to reduce the vehicle speed; and
delay the shift until the vehicle speed is below the threshold speed,
wherein the delay in the shift includes:
during a first condition, maintaining the transmission in the reverse setting until the vehicle speed is below the threshold speed; and
during a second condition, shifting the transmission to the neutral setting, stalling the engine, and maintaining the transmission in the neutral setting with the engine shutdown until the vehicle speed is below the threshold speed.

15. The system of claim 14, wherein the controller includes further instructions that cause the controller to: restart the engine after the vehicle speed is below the threshold speed and before shifting the transmission from the neutral setting to the forward setting during the second condition.

16. The system of claim 14, wherein the brake torque applied to the vehicle wheels includes applying, during the first condition, a first ratio of regenerative brake torque applied via the engine relative to wheel brake torque applied via the wheel brakes, and applying, during the second condition, a second ratio of regenerative brake torque relative to wheel brake torque, the first ratio including a higher proportion of engine brake torque, the second ratio including a higher proportion of wheel brake torque.

17. The system of claim 14, wherein the controller actuates the brakes automatically, without receiving operator input from a brake pedal.

* * * * *